Patented June 17, 1924.

1,498,270

UNITED STATES PATENT OFFICE.

JOHN J. HARRIS, OF CHICAGO, ILLINOIS.

ADHESIVE MATERIAL.

No Drawing. Application filed June 23, 1923. Serial No. 647,380.

*To all whom it may concern:*

Be it known that I, JOHN J. HARRIS, a citizen of the United States, residing at Chicago, in the county of Cook and State of Illinois, have invented a new and useful Improvement in Adhesive Materials, of which the following is a specification.

This invention relates to improvements in adhesive materials and more particularly to highly adhesive pastes and liquid adhesives adapted for use as mounting pastes, substitutes for glue and the like.

In carrying out this invention, I employ a native mineral commonly designated as bentonite and as a native colloidal clay. This material, although commonly designated as a clay, differs markedly from true clays, its particularly characteristic feature being its property of absorbing water and swelling up by reason of such absorption, frequently to several times its original volume. It is very readily suspended in water and, when so suspended, remains in suspension practically indefinitely. The suspension in water has adhesive properties, and this fact forms an additional differentiating characteristic of bentonite.

In accordance with the present invention, an amylaceous or gummy adhesive base material is intimately mixed with bentonite in varying proportions, say from 1 to 6 parts of the bentonite to each part of the adhesive base material, which may be, for example, tapioca starch, potato starch or the like. I incorporate with the mixture of adhesive material and bentonite suitable proportions of water, say from five to fifteen times by weight the amount of the mixed adhesive material and bentonite. The mixture is then cooked to form a paste.

Prior to cooking the mixture, I incorporate thereinto from one half to ten per cent of the 40% sodium silicate solution, which I have found to very remarkably increase the adhesive properties and permanence of the mixture. I may also incorporate small amounts of suitable preservatives such as carbolic acid, thymol or mixtures thereof. Small amounts of an inert material, such as whiting, may be added to impart a desired color to the paste and it has also been found that additions of small proportions, say one quarter to two per cent, of glycerine, copper sulphate, zinc sulphate or mixtures thereof, are beneficial in producing permanent and effective pastes.

As a specific example of an adhesive material made in accordance with my invention, I may employ, for example, equal parts by weight of tapioca starch and bentonite, together with approximately ten times their combined weight of water. In preparing the paste there is incorporated approximately three-fourths as much by weight of a 40% sodium silicate solution as of the bentonite. Approximately 10% of whiting and small proportions, up to 2% of glycerine and up to 4% of copper sulphate and zinc sulphate may also be incorporated. Any suitable preservative such as phenol or thymol or both, may be added.

In my prior application, Serial No. 592,495, I have pointed out that the adhesive base materials, such as the starches, and bentonite mutually interact upon each other in forming adhesives. I have now further discovered that bentonite and sodium silicate appear to modify each other in producing an adhesive effect; for example, I have found that an adhesive having the strength of a 30% sodium silicate solution may be produced by incorporating 25% of a 30% sodium silicate solution and 10% of bentonite in water. I have further found that the presence of the three constituents, the adhesive base material such as starch, the bentonite and the sodium silicate in the paste, results in a further marked differentiation of the product and greatly improves its adhesive properties.

It is readily apparent that the materials employed in connection with the present invention may be mixed dry, in order to be prepared by the user. Furthermore, I may use dry silicate of soda or solutions of other concentrations than those above named in proper proportions, as is readily apparent.

I claim:

1. An adhesive material comprising silicate of soda and bentonite.

2. An adhesive material comprising silicate of soda, amylaceous matter and bentonite.

3. An adhesive material comprising amylaceous matter and bentonite in aqueous suspension and from 1 to 10% of silicate of soda (40% solution).

4. An adhesive material comprising equal parts of amylaceous matter and bentonite in suspension in about 10 times their combined weight of water and 1 to 10% of silicate of soda (40% solution).

5. An adhesive material comprising silicate of soda, amylaceous matter and bentonite in suspension in water and small proportions of zinc and copper sulfates.

JOHN J. HARRIS.